United States Patent [19]

Smith

[11] Patent Number: 4,661,360

[45] Date of Patent: Apr. 28, 1987

[54] FILLED SNACK PRODUCT HAVING A HYDROPHILICALLY COATED FILLING

[75] Inventor: James P. Smith, Cincinnati, Ohio

[73] Assignee: The Procter & Gamble Company, Cincinnati, Ohio

[21] Appl. No.: 815,834

[22] Filed: Jan. 3, 1986

Related U.S. Application Data

[63] Continuation of Ser. No. 553,290, Nov. 17, 1983, abandoned.

[51] Int. Cl.$^4$ .................. A21D 13/00; A23G 3/00
[52] U.S. Cl. .................... 426/94; 426/283; 426/633
[58] Field of Search .................. 426/94, 633, 283

[56] References Cited

U.S. PATENT DOCUMENTS

| | | | |
|---|---|---|---|
| 1,859,206 | 5/1932 | Heisler | 426/633 |
| 2,860,053 | 11/1958 | Avera | 426/633 |
| 3,219,456 | 11/1965 | Matz et al. | 426/297 |
| 3,265,507 | 8/1966 | Japikse | 99/128 |
| 3,532,510 | 10/1970 | Zimmerman | 426/94 |
| 3,552,980 | 1/1971 | Cooper et al. | 99/128 |
| 3,615,592 | 10/1971 | Peterson | 99/134 |
| 3,656,967 | 4/1972 | Barton et al. | 99/86 |
| 3,959,498 | 5/1976 | Lyall et al. | 426/93 |
| 3,969,514 | 7/1976 | Tiemstra | 426/90 |
| 4,209,536 | 6/1980 | Dogliotti | 426/94 |
| 4,275,647 | 6/1981 | Chambers et al. | 99/339 |
| 4,360,534 | 11/1982 | Brabbs et al. | 426/560 |
| 4,401,681 | 8/1983 | Dahle | 426/94 |

FOREIGN PATENT DOCUMENTS

| | | |
|---|---|---|
| 113174 | 7/1984 | European Pat. Off. |
| 2601474 | 7/1976 | Fed. Rep. of Germany |
| 0190196 | 1/1967 | U.S.S.R. |

*Primary Examiner*—Raymond N. Jones
*Assistant Examiner*—Marianne M. Cintins
*Attorney, Agent, or Firm*—Eric W. Guttag; Steven J. Goldstein; Jerry J. Yetter

[57] ABSTRACT

A peanut butter-filled snack product or the like is disclosed. This product includes an edible, heat stable, lubricious filling having a fat content of from about 40% to about 70% by weight. In addition, an edible hydrophilic material coats this filling. The coated filling is then surrounded by a layer of dough. After the snack product is baked, the filling retains its softness and lubricity.

17 Claims, No Drawings

FILLED SNACK PRODUCT HAVING A HYDROPHILICALLY COATED FILLING

This is a continuation of application Ser. No. 553,290, filed on Nov. 17, 1983, abandoned.

TECHNICAL FIELD

The present application relates to peanut butter-filled snack products and the like having softer, more lubricious fillings.

Filled snack products are known in the art. See U.S. Pat. No. 3,532,510 to Zimmerman, issued Oct. 6, 1970. Of particular interest are peanut butter-filled crackers. These products desirably have a crisp baked outer dough shell, and a soft, lubricious filling. The dual texture of this product provides a pleasant eating experience to the consumer.

Current methods for preparing such filled-snack products require a two-step process. In the first step, the outer shell is prepared by baking a configured dough comprising primarily flour, shortening and water. In the second step, the filling is inserted into the baked dough shell. See U.S. Pat. No. 4,275,647 to Chambers et al., issued June 30, 1981, which discloses a tubular center-filled food product having a rigid, friable baked outer shell and a core of edible filling material formed by this two-step process.

Rather than using this two-step process, the filling and outer dough shell could be cobaked to form the filled snack product. However, high fat content fillings such as peanut butter will melt during baking and release oil to the dough. The result is a loss in lubricity of the filling. Also, moisture tends to migrate from the dough to the filling during baking and subsequent storage. This moisture can cause hydration of the protein in peanut butter fillings which leads to a stiffer, less desirable texture.

Accordingly, there is a need to provide filled snack products wherein a high fat content filling and dough can be co-baked without the filling losing its desirable softness and lubricity.

BACKGROUND ART

U.S. Pat. No. 3,532,510 to Zimmerman, issued Oct. 6, 1970, discloses a refrigerated product comprising a dough which surrounds and encloses a stable filling material. Typical fillings disclosed are peanut butter, cheese, meat, fruit and similar materials.

U.S. Pat. No. 2,860,053 to Avra, issued Nov. 11, 1958, discloses nut products and nut flavoring additives which are combined with a polyhydric alcohol such as sorbitol or mannitol. In the case of the nut products, whole or partial nuts such as shelled peanuts are coated with the polyhydric alcohol. This coating converts the nut surface from hygroscopic to substantially nonhygroscopic so that the nut product will not absorb moisture.

U.S. Pat. No. 3,552,980 to Cooper et al., issued Jan. 5, 1971, discloses a packaged peanut butter and jelly type product. This patent notes the problem that when sweet, aqueous spreads (e.g. jelly) are mixed with peanut butter and allowed to stand for a few days, the peanut butter becomes hard even though its moisture content has increased. This problem is solved by providing a modified sweet, aqueous spread containing 10-20% water, 10-20% of a non-aqueous edible liquid viscosity reducing agent such as glycerol, and 10-30% corn syrup solids, the remainder of the spread being water-soluble carbohydrates and naturally occurring fruit solids plus any optional ingredients. One function of the corn syrup solids is to "bind up" or hold the water present in the spread and thereby prevent its migration into the peanut butter.

U.S. Pat. No. 4,275,647 to Chambers et al., issued June 30, 1981, discloses a tubular center-filled food product having a rigid, friable baked outer shell and a core of edible filling material. The outer shell is formed from a batter containing mono and/or disaccharides, flour (10-20%), an edible fat or oil (5-15%), egg white and water. Edible fillings disclosed include confectionary cream, fruit paste, meat paste, cheese paste and the like which are sufficiently fluid to be pumpable when warm, but sufficiently stiff and firm upon cooling to be retained within the baked tubular shell.

U.S. Pat. No. 3,615,592 to Peterson, issued Oct. 26, 1971, discloses a marshmallow/peanut butter combination which reduces the migration of water from marshmallow to the peanut butter. This object is achieved by aerating the marshmallow mixture in a warm condition with a polyglycerol higher fatty acid partial ester as an emulsifier. See also U.S. Pat. No. 3,969,514 to Tiemstra, issued July 13, 1976, which discloses a nut butter/marshmallow spread combination wherein moisture transfer is lessened by lowering the difference in water activity between the two spreads and/or raising the fat content of the nut spread.

DISCLOSURE OF THE INVENTION

The present invention relates to peanut butter-filled snack products and the like. This product comprises an edible, heat stable, lubricious filling having a fat content of from about 40 to about 70% by weight. In addition, this product comprises an edible hydrophilic material which coats the filling. The coated filling is surrounded by a layer of dough comprising flour, shortening and water.

By using the present invention, the dough and high fat filling can be co-baked to form a filled baked snack product. Moisture from the dough hydrates the hydrophilic material during formation of the raw snack product and upon subsequent baking. The result is a lipophobic barrier which prevents migration of oil from the filling to the dough. Also, moisture from the dough cannot migrate to the filling so as to hydrate the protein therein. The result is a baked snack product having a filling which retains its softness and lubricity.

A. Heat Stable Filling

Any heat stable, lubricious filling which is edible and which has a fat content of from about 40 to about 70% by weight can be used in filled snack products of the present invention. As used herein, the term "heat stable" refers to the physical stabilty of the filling during baking of the snack product. Heat stable fillings do not become fluid and flow like a liquid oil during baking. As used herein, the term "lubricious" refers to the textural properties of the filling and is derived from the fat present in the filling. Lubricious fillings are those which are plastic and spread easily in the mouth during mastication. Suitable fillings can be formulated by the appropriate blending of sufficient fat with other ingredients (typically sugar and flavored solids) to provide, for example, cheese fillings, confectionery creme fillings, meat flavored fillings and the like. Preferred fillings are those derived from oilseed butters.

Several types of oilseed butter materials can be used for the filling. By "oilseed butters" is meant those butters derived from oil- and protein-containing seeds such as peanuts, cashew nuts, sunflower seeds, soybeans and the like, including mixtures of such butters. The most preferred oilseed butter is that derived from peanuts. These oilseed butters typically have sufficient fat naturally present to provide a fat content of from about 40 to about 70% by weight. However, additional fat can be included in the oilseed butter if needed. Preferably, the oilseed butter has a fat content of from about 50 to about 60% by weight. While the following description on the formation of such oilseed butters is with regard to peanut butter, it is to be understood that other oilseed butters can be formulated by suitable variation of the described method.

Peanut butter ordinarily comprises peanut paste, stabilizer, and optionally other ingredients such as emulsifier, sweetener, and salt. Peanut paste typically comprises from 80-99% by weight of the peanut butter and is usually obtained by conventional methods of roasting and blanching raw peanuts and then grinding them. The stabilizer is normally a hydrogenated fatty material utilized so that oil separation in the peanut paste does not occur and ordinarily comprises from 1-5% by weight of the peanut butter. Partially or completely hydrogenated natural fats such as peanut oil, corn oil, cottonseed oil, linseed oil, palm oil, whale oil, and other marine oils, alone or in combination, are suitable as stabilizers. A preferred stabilizer is rapeseed oil having an iodine value not greater than about 10 and is disclosed in U.S. Pat. No. 3,129,102 to Sanders, issued Apr. 14, 1964. Other preferred stabilizers are disclosed in U.S. Pat. No. 3,265,507 to Japikse, issued Aug. 9, 1966.

Peanut butter can optionally comprise from about 0.5% to 1.5% by weight emulsifiers which function to negate stickiness so that the butter does not stick to the roof of the mouth. Suitable emulsifiers include lecithin and fatty monoglycerides such as soybean monoglycerides. Many peanut butters also comprise from 1-10% by weight added sweetener such as sucrose, dextrose, fructose, honey, molasses, saccharin, and other common sweetening agents. Peanut butter can also optionally comprise from 1-1.5% by weight salt as a flavoring agent.

Some unhydrogenated or slightly hydrogenated glyceride oils can also be added to peanut butter to fine tune the consistency of it. This added oil is distinct from the peanut oil which is present in the peanut paste ingredient. If such added oil is utilized, the butter ordinarily comprises from 0.2-7% by weight of such added oil. Vegetable oil, such as peanut oil, or slightly hydrogenated soybean oil, is commonly used for this purpose.

In conventional peanut butter processing, roasted and blanched peanuts are ground to a suitable particle size to provide a peanut paste. The other peanut butter ingredients can be added before, during, or immediately after grinding to provide a homogeneous mixture. It is preferred that the processing stream be maintained in an inert atmosphere, e.g. a nitrogen atmosphere, starting just before the grinding step and continuing throughout the remainder of the process. The homogeneous mixture with its stabilizer components in a molten state is subjected to processing to properly crystallize the stabilizer. Ordinarily, the stabilizer is in a molten state when the homogeneous mixture is at a temperature greater than 100° F. (38° C.). Crystallization is carried out by cooling the homogeneous mixture from this temperature, for example, in a scrapped wall heat exchanger and then subjecting the mixture to agitation, for example, in a picker box. See U.S. Pat. No. 3,619,207 to Dzurik et al., issued Aug. 14, 1969 (herein incorporated by reference) for a preferred method of preparing peanut butter.

B. Edible Hydrophilic Materials

Of particular importance to the filled snack product of the present invention is the edible hydrophilic material which coats the filling. Typically, moisture from the dough hydrates this hydrophilic material during formation of the raw snack product and upon subsequent baking. The result is a lipophobic barrier which prevents migration of oil from the filling to the dough. Also, this moisture which is picked up by the hydrophilic material cannot subsequently migrate to the filling so as to undesirably hydrate the protein therein.

Any hydrophilic material which is edible and which can be hydrated to form a lipophobic barrier is suitable herein. This material is usually applied to the filling in a solid form, typically as a powder. However, liquid solutions of hydrophilic material are also suitable if they can coat the filling so as to provide a lipophobic barrier when the snack product is formed. Desirably, the hydrophilic material remains in a non-crystalline, "glass" state once the filled snack product is formed. Such non-crystallizable materials retain water so that the filling remains soft and lubricious over time. The result is a filled snack product which is storage stable.

Various edible compositions are suitable as edible hydrophilic materials in the present invention. Such compositions include those selected from corn syrup solids, fructose, dextrose (glucose), water-soluble modified polydextroses disclosed in U.S. Pat. No. 4,042,712 to Torres, issued Aug. 16, 1977, (herein incorporated by reference), especially at col. 2, lines 1-21, sugar alcohols such as sorbitol, mannitol and xylitol, and sucrose. Although sucrose can be used as the hydrophilic material, it is less desirable than the other hydrophilic materials. Hydrated sucrose, on heating, forms an amorphous sucrose layer which, on aging, crystallizes. The result is that the bound water is freed from the sucrose and can cause deterioration of both the baked dough layer and the filling. By contrast, hydrated corn syrup solids do not readily crystallize and therefore retain water. Accordingly, corn syrup solids are desirable for filled snack products having storage stability.

The hydrophilic material should at least coat those portions of the filling which are in contact with the dough layer. Preferably, the hydrophilic material completely coats and surrounds the filling. The amount of hydrophilic material necessary to provide a suitable lipophobic barrier primarily depends upon the amount of exposed surface area of the filling. Suitable amounts of hydrophilic material can usually be determined by the weight ratio of hydrophilic material to the filling. Typically, a weight ratio of hydrophilic material:filling of from about 1:3.5 to about 1:7 is suitable. Preferably, the weight ratio is 1:5.

C. Dough Layer

The outer portion of the filled snack product of the present invention is represented by the dough layer. This dough layer at least comprises flour plus shortening and water. Other optional ingredients such as emulsifiers (dough conditioners), leavening agents, corn syrup solids, sweetener, salt, cheese solids and the like can also be included. Generally, both cracker and cookie type doughs can be used in the filled snack products of the present invention. For example, the shortening-continuous cookie doughs disclosed in U.S. Pat. No. 4,374,863 to Savage, issued Feb. 22, 1983 (herein incorporated by reference) are suitable. However, preferred doughs are those which form a cracker-like texture upon baking.

1. Flour

Any type of flour which is suitable in cracker and cookie type doughs can be used in the present invention. For example, suitable flours include wheat flour, rye flour, corn flour, cottonseed meal, and sorghum flour. Preferably, wheat flour is used in preparing the dough of the present invention. This flour can be bleached or unbleached. Because the flour constitutes a major ingredient of the dough layer, the percentages of the remaining ingredients are referred to on a flour weight basis (FWB).

2. Shortening

In addition to flour, the dough layer comprises shortening. Fats which can be used as the shortening component can be any of the usual fat stocks employed in preparing liquid, fluid, plastic, or solid shortenings. Various fats such as cottonseed oil, soybean oil, lard, palm oil, and other vegetable, animal and marine fats, or mixtures thereof, either unhydrogenated or in various stages of hydrogenation, can be used. Suitable shortenings can also be formulated with non-absorbable, non-digestible fatty acid esters of polyols, in particular sucrose polyesters, disclosed in U.S. Pat. No. 4,005,196 to Jandacek et al., issued Jan. 25, 1977 (herein incorporated by reference).

The amount of shortening used in the dough layer can vary widely depending upon the characteristics desired. Usually, the amount of shortening used is such that the dough layer of the filled snack product, when baked, is not excessively tender. Usually, the amount of shortening present in the dough can range from about 7 to about 30% by FWB. Preferably, the amount of shortening ranges from about 15 to about 28% by FWB. This preferred shortening level is desirable for preparing baked snack products having soft and lubricious fillings which are storage stable. When such preferred shortening levels are used, it is also desirable to use a fluid or liquid shortening.

3. Water

In addition to flour and shortening, the dough layer also contains a suitable amount of water. Generally, the amount of water incorporated in the dough is such that the dough forms a cookie-like, or preferably cracker-like, texture when baked. For cracker-type doughs, the amount of water present is such that the average $a_w$ value of the entire baked snack product is typically from about 0.2 to about 0.5 and preferably from about 0.30 to about 0.36. As used herein, the term "$a_w$ value" refers to the "water activity" of the system, and is an indicator of the amount of free or unbound water present in the particular matrix being measured. For cookie-type doughs, this $a_w$ value can range from about 0.4 to about 0.75. Usually, the amount of water used in the dough ranges from about 20 to about 35% by FWB.

4. Emulsifiers

The dough layer also desirably includes emulsifiers. These emulsifiers are frequently referred to as "dough conditioners" because they are used to control the consistency of the dough. Suitable emulsifiers include mono- and diglycerides of fatty acids, sucrose partial fatty acid esters, sorbitan esters of fatty acids, polyoxyethylene sorbitan esters of fatty acids, propylene glycol esters, polyethylene glycol esters, ethoxylated mono- and diglycerides, fumarated esters of monoglycerides or their alkali metal salts, alkanoyl lactylates or their metal salts, lecithins, and the like. Preferred dough conditioners include sorbitan monostearate (Span 60), polyoxyethylene sorbitan monostearate (Tween 60), propylene glycol monostearate, glycerol lactopalmitate, sodium stearoyl fumarate, calcium stearoyl-2-lactylate, ethoxylated monoglycerides, and lecithin. The amount of emulsifier can be varied to obtain the dough properties desired. These emulsifiers are typically used at from about 0.25 to about 2% by FWB. However, higher or lower amounts can be used if desired.

5. Leavening Agent

The dough also desirably includes a leavening agent. Non-yeast leavening agents include a source of carbon dioxide such as sodium bicarbonate or potassium bicarbonate, alone or in combination with a leavening acid such as monocalcium phosphate, dicalcium phosphate, sodium acid pyrophosphate, sodium aluminum sulfate, sodium aluminum phosphate, potassium acid tartrate and the like. Preferably, an active dry yeast is used as part of the leavening agent. The amount of leavening agent used depends on the particular agent employed and the leavening characteristics desired.

6. Sweetener

Especially for cookie dough systems, a sweetener is typically included. Suitable sweeteners include sucrose, invert sugar syrups, brown sugar, corn syrup solids, fructose, dextrose (glucose), honey, molasses, maple syrup and the like. Particularly preferred sweeteners are sucrose and corn syrup solids. The amount of sweetener included typically depends upon the type of dough desired (cookie dough or cracker dough), as well as the sweetness desired.

7. Optional Ingredients

Other optional ingredients which can be included in the dough are milk products such as whole milk, skim milk, buttermilk, whey, concentrated milk products (condensed or evaporated milk), dried milk products, non-fat milk powder, dry whole milk, modified whole milk and the like, egg products, including egg whites and egg yolks, spices, other flavors such as vanilla, salt, cheese solids, color additives, preservatives, anti-oxidants and the like.

8. Dough Making

The dough layer can be prepared by standard techniques in the art for making cookie or cracker-type doughs. See Matz et al., Cookie and Cracker Technology (2d Ed. AVI Publishing Co., 1978), pp. 166-75, for standard techniques for preparing cracker doughs. Typically, the dry ingredients such as the flour, salt, corn syrup solids, etc. are mixed together. The shortening and emulsifiers are co-melted and then mixed with the dry ingredients. Any yeast, sweetener and water are then mixed in with the mixture of dry ingredients plus shortening-emulsifier to form the finished dough. The dough is usually permitted to rise before being sheeted to form a dough layer suitable in preparing the filled snack product of the present invention.

D. Method for Making the Filled Snack Product

The filled snack product is formed by appropriate combination of the following materials: (1) oilseed butter filling; (2) hydrophilic material; and (3) dough layer. Because the filling is typically plastic and maleable, it can be configured to an appropriate shape such as a cube, sphere, cylinder, cone, etc. Or, the filling can be configured later during formation of the filled snack product. Typically, the filling is configured into the appropriate shape after being surrounded by the dough layer.

The filling can be coated with a hydrophilic material by one of two methods. In the first method, the hydrophilic material can be directly applied to the surface of the filling. In the other method, the hydrophilic material can be applied to that side of the dough (inside surface) which is eventually in contact with the surface of the filling. Suitable methods for applying the hydrophilic material to either the surface of the filling or to the inside surface of the dough include spraying, dipping, coating, brushing or like methods. The hydrophilic material can either be applied in solid form (typically as a powder), or else as a liquid solution which forms a coating on the filling.

Besides the above methods, the raw snack product can be formed by co-extrusion of the coated filling and the dough.

The layer of dough partially surrounds, or preferably completely surrounds (encloses) the coated filling. The coated filling can be enclosed within the layer of dough by one of two methods. In the first method, a single layer of dough is used. In this method, the filling is placed on the single layer of dough. The edges of this single layer of dough are then sealed together so as to enclose the coated filling therein to form a raw snack product.

In the second method, two layers of dough are used. The coated filling is placed on the first layer of dough. A second layer of dough is then placed on top of the first layer of dough. This second layer of dough is then compressed around the filling and sealed against the first layer of dough to enclose the filling so as to form the raw snack product.

Once the coated filling is enclosed within the dough, the raw snack product formed can then be baked to form the finished (baked) filled snack product. Temperature conditions suitable for forming other baked goods can be used in forming the baked filled snack product. Typically, the filled snack product is baked at a temperature of from about 350° to about 500° F. (177° to 260° C.) for from about 2 to about 12 minutes. Preferably, the filled snack product is baked at a temperature of from about 450° to about 500° F. (232° to 260° C.) for from about 3 to about 4 minutes. The particular baking conditions employed depend upon the size of the filled-snack product and the amount of doneness desired. Baking can be followed by a drying step at reduced temperature to achieve the desired $a_w$ value for the baked snack product.

Specific Methods for Making Peanut Butter-Filled Snack Products of the Present Invention The following illustrates methods for preparing peanut butter-filled snack products according to the present invention:

Step 1: Forming the dough

The ingredients used in the preparation of the dough were as follows:

| Dough Ingredient | % (FWB) |
| --- | --- |
| Unbleached All Purpose Flour | 100.00 |
| Extra Sharp Cheddar Cheese Solids | 2.08 |
| Romano Cheese Solids | 2.08 |
| Salt | 2.08 |
| Calcium Propionate | 0.26 |
| Baking Soda | 0.52 |
| Corn Syrup Solids (Fro-Dex 42) | 10.00 |
| Paprika | 0.25 |
| CRISCO ® Oil | 15.63 |
| CRISCO ® | 5.21 |
| Calcium stearoyl-2-lactylate (Verv) | 0.50 |
| Ethoxylated monoglyceride (Starfol D) | 0.50 |
| Sucrose | 1.67 |
| Active Dry Yeast | 2.92 |
| Tap $H_2O$ (115° F.) | 31.25 |

All dry ingredients listed from the flour to the paprika were added to a McDuffy mixing bowl which was affixed to a model C-100 Hobart Mixer. The mixer was set at the No. 1 speed and the dry ingredients were then blended for ten minutes with occasional scraping. The CRISCO ® Oil, CRISCO ®, calcium stearoyl-2-lactylate and ethoxylated monoglyceride were co-melted at approximately 140° F. (60° C.). The warm mixture of shortening and emulsifier was then added to the McDuffy bowl and mixed with the dry ingredients at a No. 1 speed setting. The contents of the bowl were scraped after three minutes mixing; total mixing time was six minutes. The yeast, sucrose and water were combined separately and then stirred until the yeast was dispersed and the sucrose dissolved. The yeast was permitted to hydrate for five minutes. This dispersion of yeast and sucrose was then added to the McDuffy bowl and the formulation mixed for five minutes at a No. 1 speed setting to form the finished dough. The contents of the bowl were scraped down once after the first 1.5 minutes of mixing.

The finished dough was then placed in a two-quart stainless steel bowl, covered with aluminum foil and permitted to rest for ten minutes at room temperature. Approximately 100 g of this dough was then passed through a hand-operated pasta-making mill (Imperia SP150). The dough was passed three times through the roller at the No. 1 setting (thickest), two times through the roller at the No. 3 setting, one time through the roller at the No. 4 setting, and finally one time through the roller at the No. 5 setting. This yielded a dough sheet with an average thickness of 0.029 inches (0.73 mm) which was used to form the filled snack product.

Step 2: Forming the Filled Snack Product

Embodiment 1

In this embodiment, the dough sheet from Step 1 was cut into 2 inch×2 inch (5 cm×5 cm) squares. A filling of creamy JIF ® peanut butter was coated with Fro-Dex 42 corn syrup solids and was then placed on one half of the dough square. A bead of egg white solution (1:1 mixture of fresh egg white:distilled water) was laid around the edge of the square using a pipette. The square was folded over the coated filling, and then the edges thereof were sealed together by pressing with the tines of a fork. The result was a 2 inch×1 inch (5 cm×2.5 cm) rectangular shaped raw snack product containing a peanut butter filling. The surface of each raw snack product was punctured three times with the tines of a fork. The raw snack products were then placed on a wire screen. The raw snack products were permitted to rest for 15 minutes at 58° C., were brushed with an egg white solution and then salted. The raw snack products were then ready for baking.

Embodiment 2

In this embodiment, two dough sheets were used. The outline of 1 inch (2.5 cm.) diameter circles were made on the first sheet using a cutter. A creamy JIF ® peanut butter filling coated with Fro-Dex 42 corn syrup solids was then placed on the center of each circle. A bead of egg white solution (as in Embodiment 1) was placed around the outer edge of each circle. The second dough sheet was then placed on top of the first sheet. There was sufficient sag of the top sheet over the lumps of filling so that a cylindrical cutter/crimper could be used to seal the second sheet to the first sheet and free each raw snack product from the remainder of the sheet. Each raw snack product, which had a shape similar to that of an oyster cracker, was punctured twice with fork tines. The raw snack products were then placed on a wire screen. After resting as in Embodiment 1, the raw snack products were then brushed with an egg white solution. These raw snack products were then salted as in Embodiment 1. The raw snack products were then ready for baking.

Step 3: Baking of Raw Filled Snack Product

The raw snack products from Step 2 were baked in an electric oven at 500° F. (260° C.) for three minutes, then immediately transferred to a convection oven and dried at 250°–260° F. (121°–127° C.) for 25 minutes. The baked snacks were sprayed with CRISCO ® Oil immediately on removal from the drying oven. The average $a_w$ value of the baked snack products was 0.30 to 0.36.

What is claimed is:

1. A baked filled snack product, which comprises:
   (1) an edible, heat stable, lubricious oilseed butter filling selected from the group consisting of peanut butter, cashew nut butter, sunflower seed butter and mixtures thereof having a fat content of from about 40% to about 70% by weight;
   (2) an edible hydrophilic material coating said filling wherein such hydrophilic material is corn syrup solids; and
   (3) a layer of dough comprising flour, shortening and water, said dough layer partially or completely surrounding said coated filling.

2. A snack product according to claim 1 wherein said oilseed butter has a fat content of from about 50 to about 60% by weight.

3. A snack product according to claim 2 wherein said oilseed butter is peanut butter.

4. A snack product according to claim 1 wherein the weight ratio of said corn syrup solids to said filling is from about 1:3.5 to about 1:7.

5. A snack product according to claim 1 wherein said dough layer completely surrounds said coated filling.

6. A snack product according to claim 5 which has been baked.

7. A baked snack product according to claim 6 which has an $a_w$ value of from about 0.2 to about 0.5.

8. A baked snack product according to claim 6 which has an $a_w$ value of from about 0.4 to about 0.75.

9. A baked peanut butter-filled snack product, which comprises:
   (1) a peanut butter filling having a fat content of from about 50 to about 60% by weight;
   (2) corn syrup solids coating said filling; and
   (3) a layer of dough comprising flour, shortening and water, said dough layer completely surrounding said coated filling.

10. A baked snack product according to claim 9 which has an $a_w$ value of from about 0.2 to about 0.4.

11. A baked snack product according to claim 9 which has an $a_w$ value of from about 0.4 to about 0.75.

12. A method for making a baked filled snack product, which comprises the steps of:
   (a) providing an edible, heat stable, lubricious oilseed butter filling selected from the group consisting of peanut butter, cashew nut butter, sunflower seed butter and mixtures thereof having a fat content of from about 40% to about 70% by weight;
   (b) coating the filling with an edible hydrophilic material wherein such hydrophilic matrial is corn syrup solids;
   (c) partially or completely surrounding the coated filling with a layer of dough containing flour, shortening and water, to form a raw filled snack product; and
   (d) baking the raw snack product to form a baked filled snack product.

13. A method according to claim 12 wherein the raw snack product is baked at a temperature of from about 350° to about 500° F. for from about 2 to about 12 minutes.

14. A method according to claim 12 wherein the oilseed butter has a fat content of from about 50 to about 60% by weight.

15. A method according to claim 14 wherein the filling is peanut butter.

16. A method according to claim 13 wherein the weight ratio of the corn syrup solids to the filling is from about 1:3.5 to about 1:7.

17. A method according to claim 12 wherein the dough layer completely surrounds said coated filling.

* * * * *